US012771075B2

United States Patent
(12) United States Patent
Aboulkassem et al.

(10) Patent No.: US 12,771,075 B2
(45) Date of Patent: Oct. 20, 2026

(54) CONTACT ARRANGEMENT FOR A COAXIAL PLUG AND MULTIPLE CONTACT ARRANGEMENT

(71) Applicant: TE Connectivity Germany GmbH, Bensheim (DE)

(72) Inventors: Samir Aboulkassem, Bensheim (DE); Guenther Mumper, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 476 days.

(21) Appl. No.: 18/053,929

(22) Filed: Nov. 9, 2022

(65) Prior Publication Data

US 2023/0155326 A1 May 18, 2023

(30) Foreign Application Priority Data

Nov. 12, 2021 (DE) ........................ 102021129580.7
Apr. 19, 2022 (DE) ........................ 102022109463.4

(51) Int. Cl.

*H01R 13/645* (2006.01)
*H01R 13/642* (2006.01)
*H01R 24/38* (2011.01)
*H01R 103/00* (2006.01)

(52) U.S. Cl.

CPC ....... *H01R 13/6456* (2013.01); *H01R 13/642* (2013.01); *H01R 24/38* (2013.01); *H01R 2103/00* (2013.01)

(58) Field of Classification Search

None
See application file for complete search history.

(56) References Cited

U.S. PATENT DOCUMENTS

| | | | | |
|---|---|---|---|---|
| 5,775,960 | A | 7/1998 | Saito et al. | |
| 7,625,227 | B1 * | 12/2009 | Henderson | H01R 13/6275 439/353 |
| 8,491,333 | B2 * | 7/2013 | Evans | H01R 13/502 439/578 |
| 9,362,656 | B2 | 6/2016 | Singhammer et al. | |
| 10,116,097 | B2 * | 10/2018 | Nakashima | H01R 13/111 |
| 10,770,840 | B1 * | 9/2020 | Garver | H01R 24/40 |
| 10,992,087 | B2 * | 4/2021 | Hoyack | H01R 13/434 |
| 11,417,978 | B2 | 8/2022 | Xie et al. | |

(Continued)

FOREIGN PATENT DOCUMENTS

| | | | |
|---|---|---|---|
| CN | 111430958 | B | 6/2021 |
| EP | 3849020 | A1 | 7/2021 |

(Continued)

OTHER PUBLICATIONS

Korean Office Action dated Aug. 5, 2024 with English translation, corresponding to Application No. 10 2022 0149777, 11 pages.

(Continued)

*Primary Examiner* — Oscar C Jimenez
(74) *Attorney, Agent, or Firm* — Barley Snyder

(57) ABSTRACT

A contact arrangement for a coaxial plug comprises an inner conductor contact having an insertion opening for inserting a mating contact in a mating direction, and an insulating dielectric body enclosing the inner conductor contact. The inner contact and the insulation body each define insertion bevels in an area of the insertion opening.

20 Claims, 5 Drawing Sheets

(56) References Cited

U.S. PATENT DOCUMENTS

| | | | | |
|---|---|---|---|---|
| 2003/0139081 | A1* | 7/2003 | Hall | H01R 24/40<br>439/352 |
| 2003/0224656 | A1 | 12/2003 | Yoshida | |
| 2009/0197479 | A1 | 8/2009 | Glick et al. | |
| 2016/0141784 | A1* | 5/2016 | Hashiguchi | H01R 24/50<br>439/733.1 |
| 2019/0199008 | A1 | 6/2019 | Kanemura et al. | |
| 2021/0391663 | A1 | 12/2021 | Xie et al. | |
| 2023/0291149 | A1* | 9/2023 | Tanaka | H01R 24/54 |

FOREIGN PATENT DOCUMENTS

| | | | |
|---|---|---|---|
| JP | 2003297493 | A | 10/2003 |
| JP | 2004139797 | A | 5/2004 |
| JP | 2019114489 | A | 7/2019 |
| KR | 101900377 | B1 | 9/2018 |
| KR | 1020200110647 | A | 9/2020 |
| WO | 2020181429 | A1 | 9/2020 |
| WO | 2021156843 | A1 | 8/2021 |

OTHER PUBLICATIONS

Japanese Office Action dated Dec. 26, 2023 with English translation, corresponding to Application No. 2022-179208, 17 pages.
Extended European Search Report from the European Patent Office dated Apr. 6, 2023, corresponding to Application No. 22206861.1-1201, 9 pages.
European Patent Office Examination Report dated Jun. 18, 2025, corresponding to Application No. 22 206 861.1-1201, 9 pages.
Indian Examination Report dated Feb. 6, 2026, corresponding to Application No. 202244063929, 7 pages.

* cited by examiner

CONTACT ARRANGEMENT FOR A COAXIAL PLUG AND MULTIPLE CONTACT ARRANGEMENT

CROSS-REFERENCE TO RELATED APPLICATIONS

This application claims the benefit of German Patent Application No. DE 102021129580.7 filed on Nov. 21, 2021, and German Patent Application No. DE 102022109463.4 filed on Apr. 19, 2022, the whole disclosures of which are incorporated herein by reference.

FIELD OF THE INVENTION

The present invention relates to electrical connectors, and more particularly, to a contact arrangement for a coaxial plug.

BACKGROUND

When mating two contact arrangements, such as two coaxial connectors, for example a plug with a socket or a coupling, incorrect positioning of an internal central contact can prevent mating and deform the central contact to such an extent that it can no longer be used. In series production, contact arrangements for a coaxial plug that would lead to faulty mating are sorted out. This can lead to increased manufacturing costs.

Accordingly, there is a need for a contact arrangement for a coaxial plug that reduces the susceptibility to mating errors.

SUMMARY

A contact arrangement for a coaxial plug according to an embodiment of the present disclosure comprises an inner conductor contact having an insertion opening for inserting a mating contact in a mating direction, and an insulating dielectric body enclosing the inner conductor contact. The inner contact and the insulation body each define insertion bevels in an area of the insertion opening.

BRIEF DESCRIPTION OF THE DRAWINGS

The invention will now be described by way of example with reference to the accompanying Figures, of which.

DETAILED DESCRIPTION OF THE EMBODIMENTS

Figure 1:
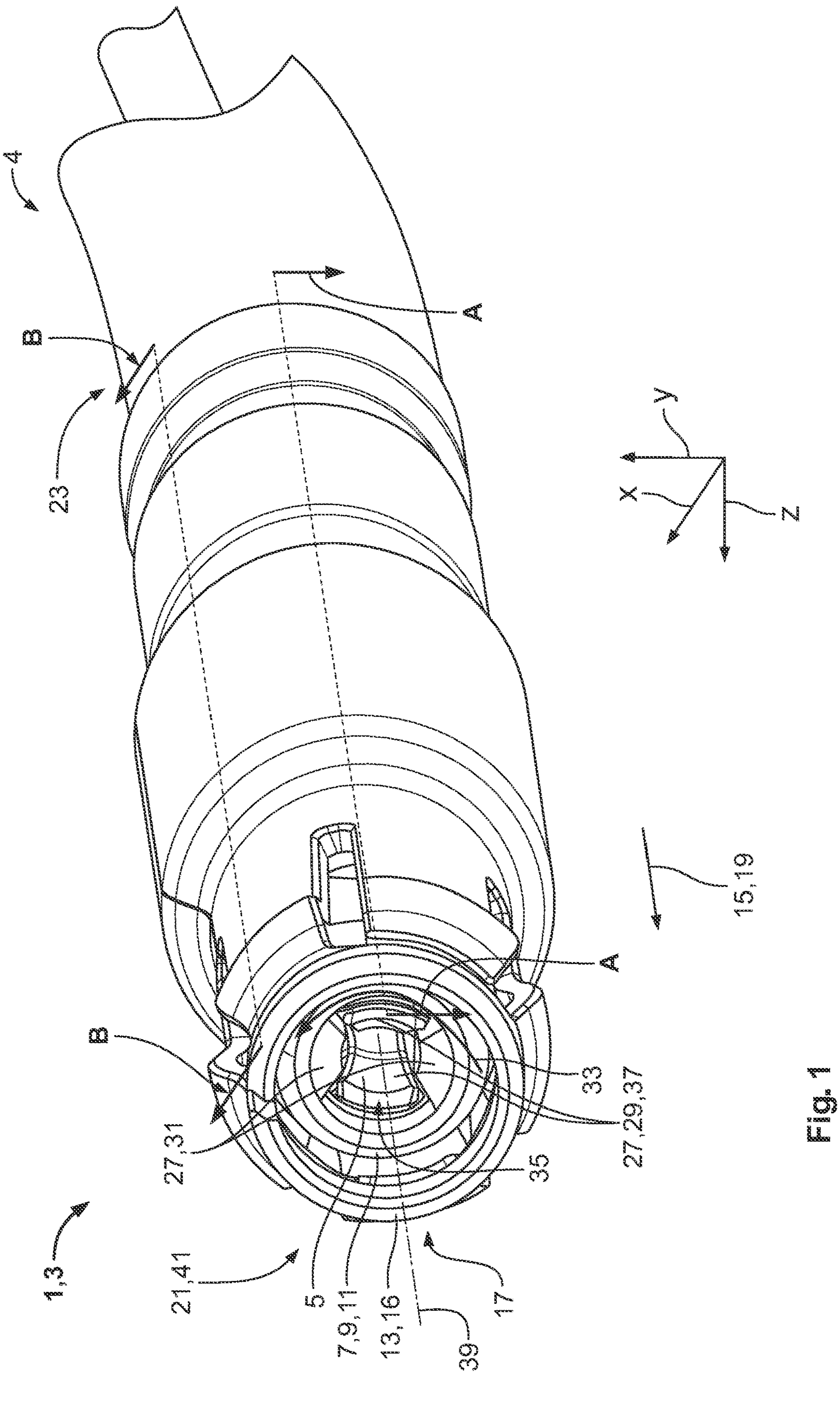
FIG. 1 is a perspective view of a configuration of the coaxial connector/contact arrangement for a coaxial plug according to the invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A contact arrangement for a coaxial plug 1 according to an embodiment of the present disclosure is shown in FIG. 1. The contact arrangement 1 may also be referred to as a coaxial connector 1 and is shown in perspective view. An exemplary coordinate system is shown which characterizes an x-direction, a y-direction and a z-direction for the purposes of this disclosure.

The exemplary coaxial connector 1 shown in FIG. 1 is comprises a coaxial coupling 3, but can also be configured as a coaxial socket (not shown) without departing from the scope of the present disclosure. Both the coaxial coupling 3 and the coaxial socket are configured or adapted for mating with a coaxial plug having a pin-shaped inner conductor. The coaxial coupling 3 as well as the coaxial socket (not shown) are thus female end pieces for connecting two coaxial cables 4. The coaxial coupling 3 has an inner conductor contact 5 and an insulation body 7 enclosing the inner conductor contact 5. The insulation body 7 consists of a dielectric 9, i.e., an electrically insulating material 11.

The coaxial connector 1 further includes an outer conductor contact 13, which may be made of a metal 16 and is electrically connected to an outer conductor of the coaxial cable 4. The outer conductor represents a shielding of the coaxial cable 4. The inner conductor contact 5, the insulation body 7 as well as the outer conductor contact 13 extend in a mating direction 15, which is oriented parallel to the z-direction. A plug face 17 of the coaxial connector 1 points in the mating direction 15. The mating direction 15 corresponds to a longitudinal direction 19 along which the coaxial connector 1 extends. The coaxial connector 1 has a plug-side end 21 and a cable-side end 23. At the cable-side end 23, the coaxial cable 4 is connected to the coaxial connector 1. This is shown schematically. The plug face 17 is formed by a plug opening-side end 41 of the inner conductor contact 5 and by the plug opening-side end 41 of the insulation body. At the plug-side end 21, the inner conductor contact 5 has an insertion opening 25. This is configured to receive a mating contact (not shown), for example in the form of a pin-shaped inner conductor of a coaxial plug.

In the configuration of the coaxial connector 1 shown, the insertion opening 25 has four insertion bevels 27. These are formed by both the inner conductor contact 5 and the insulation body 7. For differentiation purposes, the insertion bevels 27 of the inner conductor contact 5 can be referred to as first insertion bevels 29 and the insertion bevels 27 of the insulation body 7 can be referred to as second insertion bevels 31. The first and second insertion bevels 29,31 are each formed in pairs and are diametrically opposed.

The configuration of the coaxial connector 1 shown has, by way of example only, four insertion bevels 27, although in other configurations an almost arbitrary number of first insertion bevels 29 and an almost arbitrary number of second insertion bevels 31 can be provided. Particularly preferably and practicably, however, a pair of first and second insertion bevels 29, 31 is provided in each case, with a first insertion bevel 29 following a second insertion bevel 31 in each case in a circumferential direction 33. The insertion bevels 27 form an insertion funnel 35. The first insertion bevels 27 are formed on deflectable spring arms 37, which are deflectable radially away from an axis 39 of the coaxial connector toward the insulation body 7. The inner conductor contact 5 is accommodated in the insulation body 7 without radial pretension. In other configurations (not shown), the inner conductor contact 5 can be accommodated in the insulation body 7 without clearance.

Figure 2:
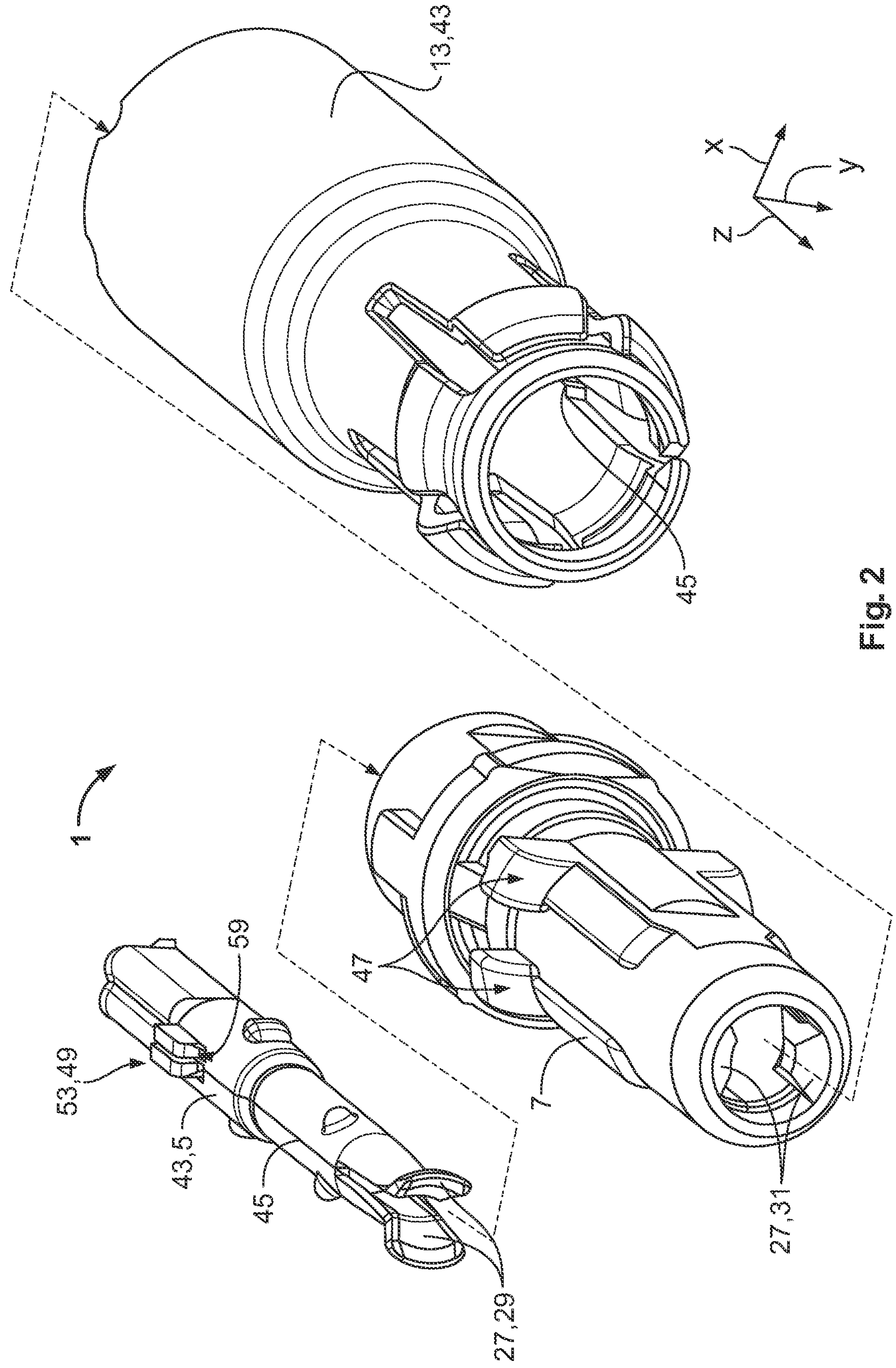
FIG. 2 is an exploded view of the coaxial connector of FIG. 1.

FIG. 2 shows an exploded view of the coaxial connector 1, with the dashed line schematically showing along which directions the inner conductor contact 5 is received in the insulation body 7 and the insulation body is received in the outer conductor contact 13. In FIG. 2, it can further be seen that both the inner conductor contact 5 and the outer conductor contact 13 are punched-bent parts 43 that have a punched-bent seam 45. FIG. 2 also shows the paired first and second insertion bevels 29, 31 formed by the inner conductor contact 5 and the insulation body 7, respectively.

Figure 4:
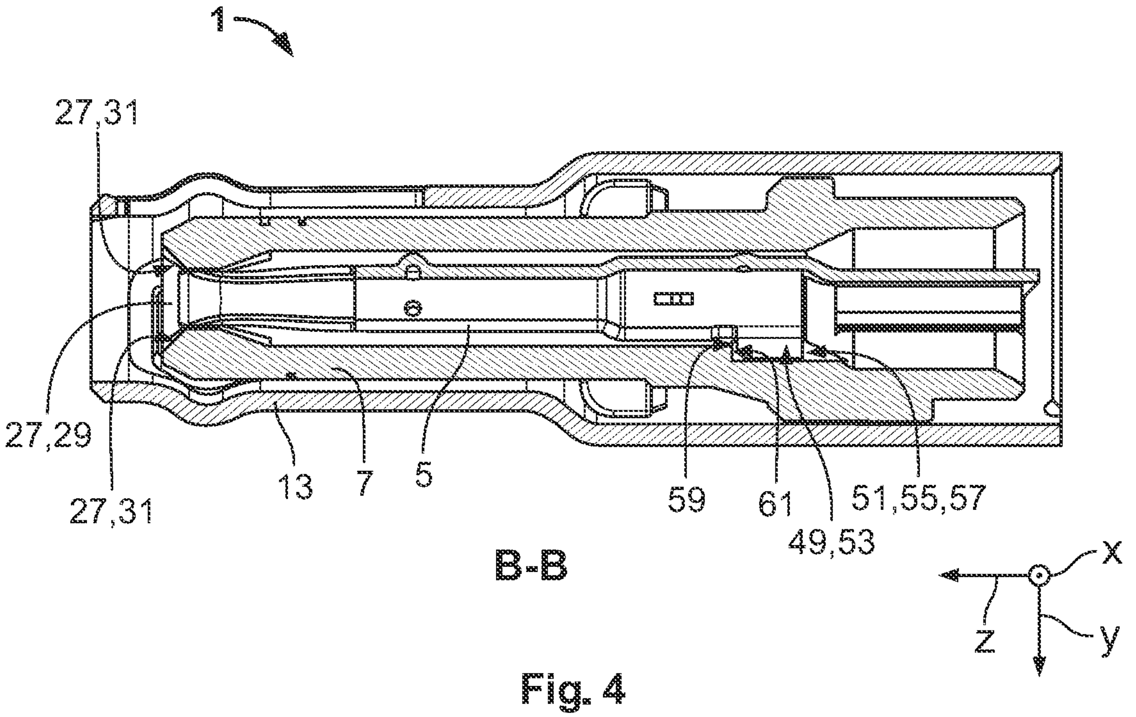
FIG. 4 is a sectional view of the coaxial connector according to the invention along the line B-B shown in FIG. 1.

For correct orientation of the insulation body 7 with respect to the outer conductor contact 13, the insulation body 7 has centering elements 47. For correct orientation of the inner conductor contact 5 with respect to the insulation body 7, the insulation body 7 has coding elements 51. These are formed inside the insulation body 7 and are shown in FIG. 4. The inner conductor contact 5 has mating coding elements 49 which are designed to interact with the coding elements 51 of the insulation body 7. In the configuration shown, the mating coding elements 49 of the inner conductor contact 5 are formed as a tab or fin 53 that can be inserted into a recess 55 or groove 57 of the insulation body 7. In the configuration shown, the coding elements 51 are formed as a recess 55 or groove 57. In other configurations, the groove 57 may be formed on the inner conductor contact 5 and the fin 53 may be formed on the insulation body 7. Other configurations of interacting coding elements 49, 51 are also conceivable.

By means of the centering elements 47, the coding elements 51 and the counter-coding elements 49, a rotational alignment of the insulation body 7 to the outer conductor contact 13 or of the inner conductor contact 5 to the insulation body 7 is possible. The mating coding elements 49 of the inner conductor contact 5 also form a stop 59. This is configured to limit a position of the inner conductor contact 5 when it is inserted into the insulation body 7 in the longitudinal direction 19. For this purpose, the stop 59 can abut against an abutment surface 61 of the insulation body 7, as shown in FIG. 4.

Figure 3:
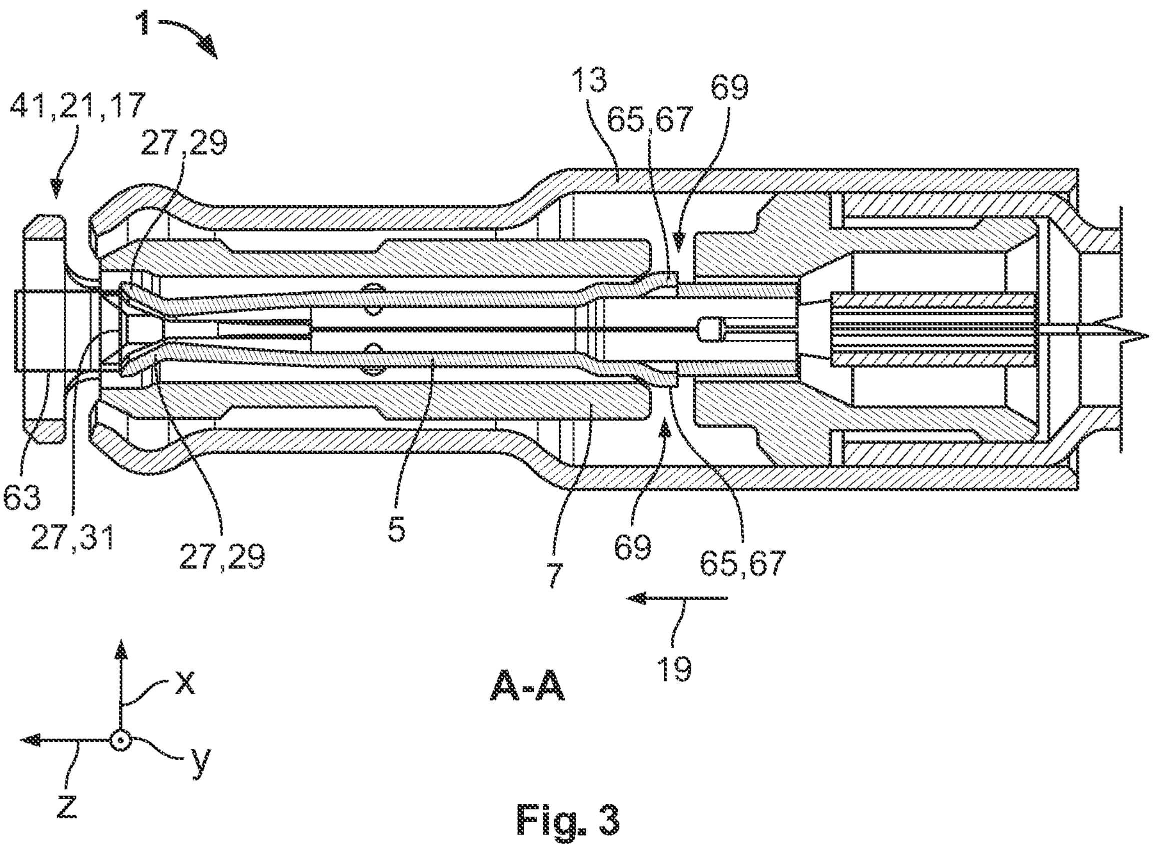
FIG. 3 is a sectional view of the coaxial connector according to the invention along the line A-A shown in FIG. 1.

In FIG. 3, the coaxial connector 1 of FIG. 1 is shown in a section along the dotted line A-A. It can be seen that the inner conductor contact 5 and the insulation body 7 extend along the longitudinal direction 19. The inner conductor contact 5 also extends along the longitudinal direction 19 to the plug opening-side end 41 of the insulation body 7. This improves the high-frequency properties of the coaxial connector 1 as a defined and continuous shielding of the inner conductor contact 5 is always ensured and, after mating with a mating connector, a defined and continuous shielding of the inner conductor is also ensured.

The configuration of the coaxial connector 1 has the further advantage that a test tip 63, this is shown schematically in the form of a rectangle, can be moved at the plug-side end 21 of the coaxial connector 1, i.e., towards the plug face 17, and brought into contact with it. With this test tip 63, the inner conductor contact 5 can be contacted. This allows a determination of the position of the inner conductor contact 5 in the insulation body 7 or to confirm a correct position. Furthermore, it can be seen in FIG. 3 that the inner conductor contact 5 is secured by latching elements 65 in the form of latching hooks 67 in latching openings 69 of the insulation body 7.

Figure 5:
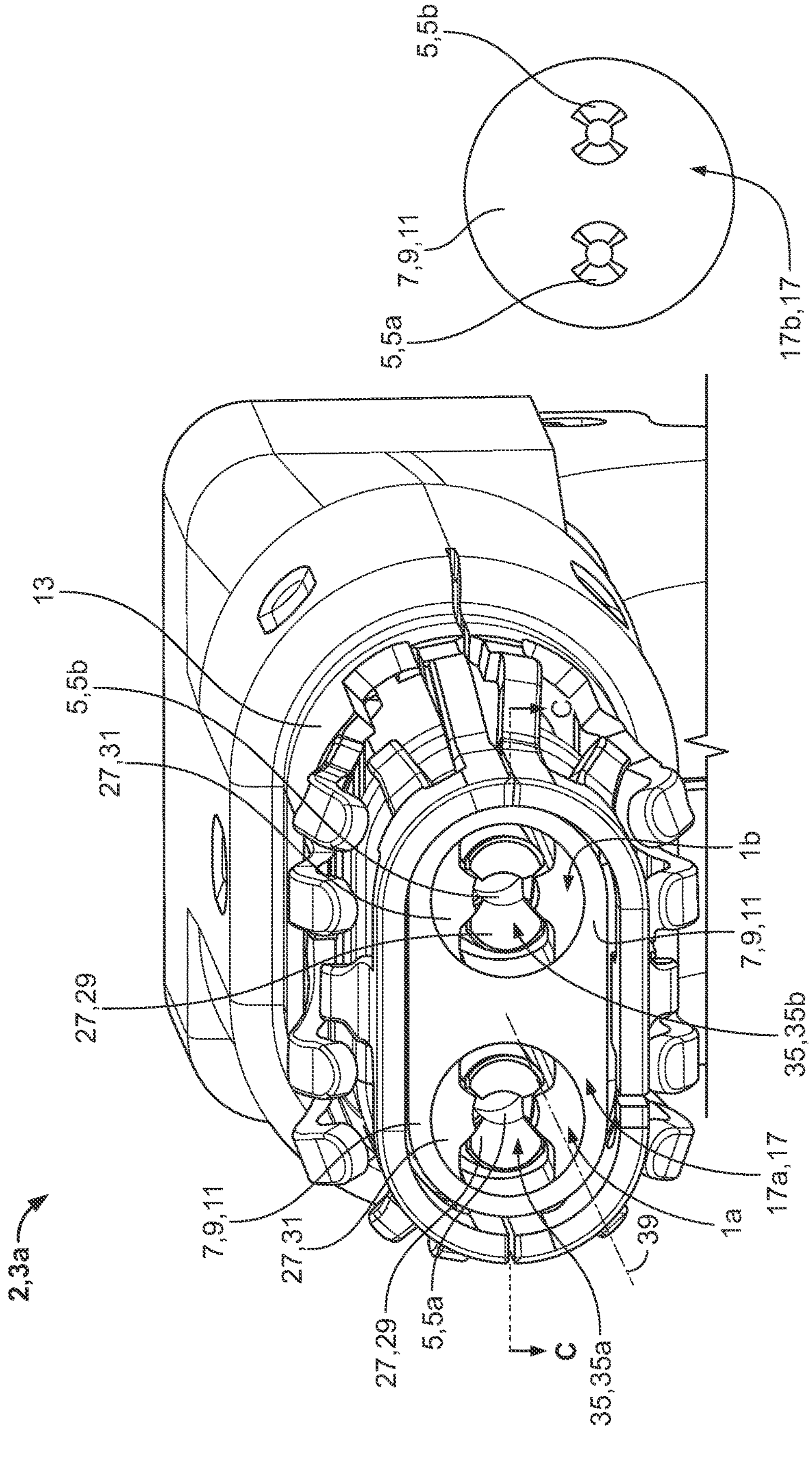
FIG. 5 is a perspective view of a multiple contact arrangement.
Figure 6:
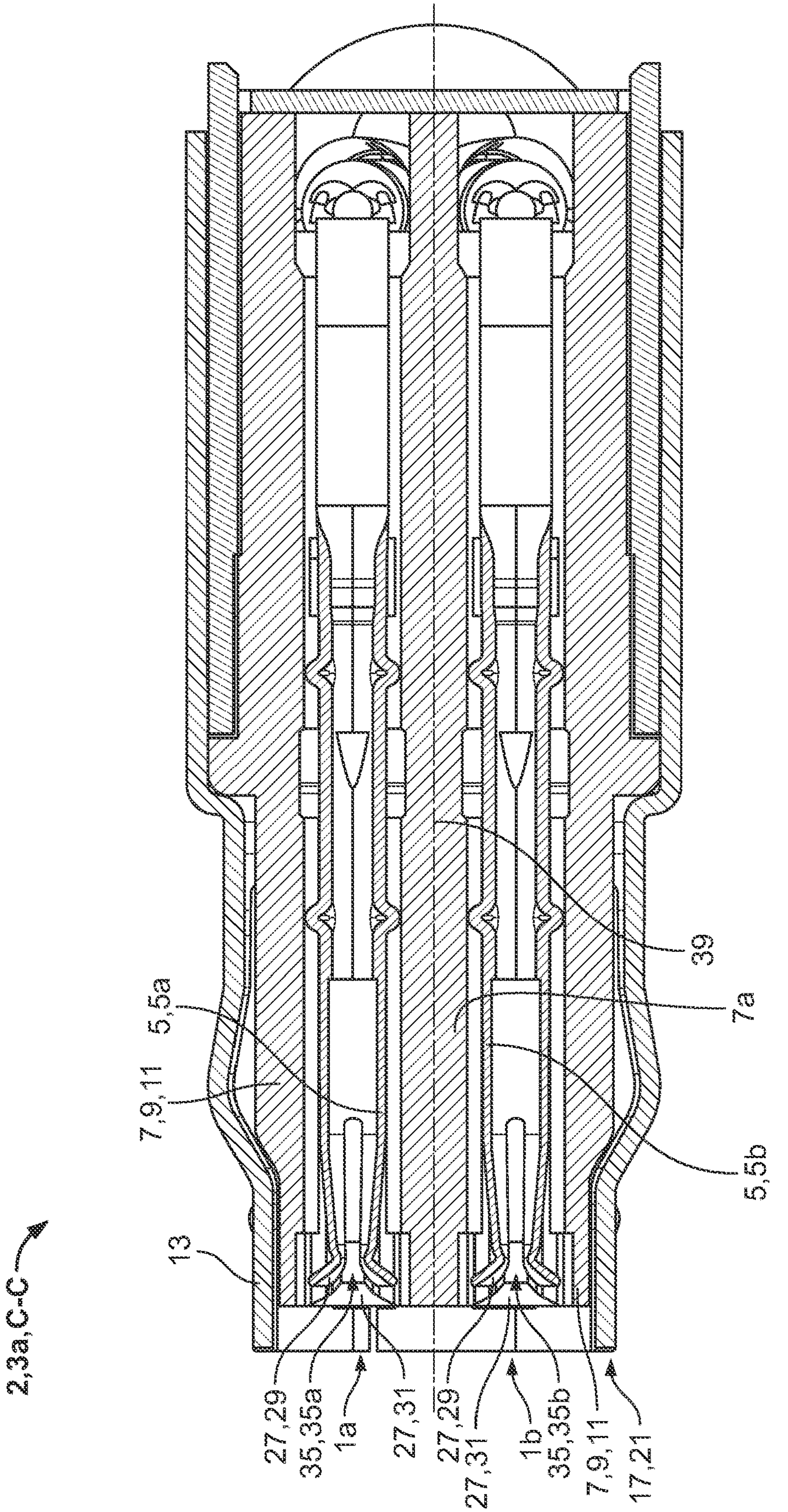
FIG. 6 is a sectional view of the multiple contact arrangement of FIG. 5 along the line C-C shown in FIG. 5.

In FIG. 5 and FIG. 6, a multiple contact arrangement 2 is shown. The multiple contact arrangement 2 may be referred to as a coaxial connector 1 and is a twinaxial connector 1*c*. Also the shown twinaxial connector 1*ca* is a coaxial coupling 3, i.e. in particular a twinaxial coupling 3*a*. In contrast to the previously described configuration of the contact arrangement 1, the multiple contact arrangement 2 has two contact arrangements 1. A first contact arrangement 1*a* and a second contact arrangement 1*b* are identical. The multiple contact arrangement thus has a first inner conductor contact 5*a* and a second inner conductor contact 5*b*. The elements of the inner conductor contacts 5*a* and 5*b* correspond to those of the inner conductor contact 5 of the previously described configuration. Thus, the multiple contact arrangement 2 shown has a first insertion funnel 35*a* and a second insertion funnel 35*b*.

Such a multiple contact arrangement 2 has the advantage that, for example, symmetrical signals with a higher data rate can be transmitted via a pair of inner conductor contacts 5. Such connectors and cables can advantageously be used for contacting SA-TA3 or DisplayPort interfaces. The inner conductor contacts 5 are arranged next to each other and galvanically isolated from each other.

The configuration of the multiple contact arrangement 2 shown also has the further elements such as the second insertion bevels 31, the first insertion bevels 29, the insulation body 7 consisting of a dielectric 9, i.e., an insulating material 11, and the outer conductor contact 13. In the multiple contact arrangement 2 shown, the insulation body 7 of the first contact arrangement 1*a* and the insulation body 7 of the second contact arrangement 1*b* are monolithic, i.e., are formed in one piece and form a common insulation body 7*a*. The multiple contact arrangement 2 shown has an oval plug face 17*a*, which describes a shape composed of two semicircles and a rectangle, wherein the rectangle is disposed between the semicircles.

An alternative geometry of the plug face 17 is shown schematically on the right side of FIG. 5 in the form of a round plug face 17*b*. In FIG. 6, the multiple contact arrangement 2 of FIG. 5 is shown in sectional view along the line C-C. The identical configuration of the first inner conductor contact 5*a* and the second inner conductor contact 5*b*, as well as the insertion funnels 35*a* and 35*b*, can be clearly seen. Both inner conductor contacts 5 extend the same distance to the plug-side end 21. Both inner conductor contacts 5 are also completely surrounded by the outer conductor contact 13 and galvanically separated both from each other and from the outer conductor contact 13 by the common insulation body 7*a*.

Furthermore, it can be seen that the inner conductor contacts 5*a* and 5*b* inside the common insulation body 7*a* differ slightly in shape from the inner conductor contact 5 of FIG. 1 to FIG. 4. At the plug-side end 21, i.e., in the configuration of the elements of the plug face 17 and in particular in their function of facilitating the insertion of a mating contact, the two configurations do not differ. The general geometry of the plug face 17 and also the number of inner conductor contacts 5 and thus the number of insertion funnels 35 are different, as can be seen in the comparison of FIG. 1 with FIG. 5.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A contact arrangement for a coaxial plug, comprising:

an inner conductor contact having an insertion opening adapted to receive a mating contact in a mating direction; and an insulating body enclosing the inner conductor contact, the inner conductor contact and the insulating body each defining insertion bevels in an area of the insertion opening, the insertion bevels of the inner conductor contact and the insulating body are arranged alternately in a circumferential direction and together form an insertion funnel, the insertion bevels of each of the inner conductor contact and the insulating body each taper continuously in the mating direction, the insertion bevels of the inner conductor contact and the insulating body are flush with one another in the circumferential direction and together define the insertion opening.

2. The contact arrangement according to claim 1, wherein each insertion bevel of the inner conductor contact is arranged adjacent to one of the insertion bevels of the insulating body in the circumferential direction.

3. The contact arrangement according to claim 1, wherein two opposing insertion bevels of the inner conductor contact and two opposing insertion bevels of the insulating body form the insertion funnel.

4. The contact arrangement according to claim 3, wherein the inner conductor contact and the insulating body extend along a longitudinal direction, the inner conductor contact extending in the longitudinal direction to a plug opening-side end of the insulating body.

5. The contact arrangement according to claim 1, wherein the inner conductor contact is arranged in contact with the insulating body.

6. The contact arrangement according to claim 1, wherein the inner conductor contact is arranged in the insulating body without pretension in a radial direction.

7. The contact arrangement according to claim 1, wherein the insertion bevels of the inner conductor contact are formed at least in sections by spring arms of the inner conductor contact which are resiliently deflectable towards the insulating body.

8. The contact arrangement according to claim 1, further comprising an outer conductor contact enclosing the insulating body and the inner conductor contact.

9. The contact arrangement according to claim 8, wherein the insulating body includes centering elements preventing rotation of the insulating body as it is inserted into the outer conductor contact.

10. The contact arrangement according to claim 1, wherein the insulating body includes coding elements preventing rotation of the inner conductor contact as it is inserted into the insulating body.

11. The contact arrangement according to claim 10, wherein the inner conductor contact comprises mating coding elements engaging with the coding elements of the insulating body and establishing at least one rotational alignment between the inner conductor contact and the insulating body.

12. The contact arrangement according to claim 11, wherein the mating coding elements of the inner conductor contact form a stop limiting the position of the inner conductor contact in a longitudinal direction as it is inserted into the insulating body.

13. The contact arrangement of claim 1, further comprising a second conductor contact having an insertion opening adapted to receive an other mating contact in the mating direction, the inner conductor contact is a first conductor contact, each of the first and second conductor contacts are enclosed by the insulating body.

14. The contact arrangement according to claim 13, wherein the first and second inner conductor contacts are arranged at least one of symmetrically or parallel to each other in the insulating body.

15. The contact arrangement according to claim 1, wherein each insertion bevel of the inner conductor contact abuts one of the insertion bevels of the insulating body in the circumferential direction.

16. A contact arrangement, comprising:

an inner conductor contact extending along a longitudinal direction and having a plurality of first insertion bevels defined on a first end thereof;

an insulating body extending along the longitudinal direction and having a plurality of second insertion bevels defined on a first end thereof, the first and second insertion bevels arranged adjacent to one another in a circumferential direction and flush with one another in the circumferential direction, the first and second insertion bevels together defining an insertion opening of the contact arrangement adapted to receive a mating contact in a mating direction; and an outer conductor contact enclosing the insulating body and the inner conductor contact in the longitudinal direction, the insulating body includes centering elements preventing rotation of the insulating body relative to the outer conductor contact.

17. The contact arrangement according to claim 16, wherein the first and second insertion bevels taper radially inward in the mating direction.

18. The contact arrangement according to claim 16, wherein the first insertion bevels are formed at least in sections by spring arms of the inner conductor contact which are deflectable resiliently towards the insulating body.

19. The contact arrangement according to claim 16, wherein the insulating body encloses the inner conductor contact in the longitudinal direction.

20. The contact arrangement according to claim 16, wherein the insulating body includes:

coding elements preventing rotation of the inner conductor contact relative to the insulating body.

* * * * *